United States Patent [19]
Ose

[11] Patent Number: 5,768,945
[45] Date of Patent: Jun. 23, 1998

[54] EXTENSION HANDLE FOR A BICYCLE SHIFTING DEVICE

[75] Inventor: Kenji Ose, Sakai, Japan

[73] Assignee: Shimano, Inc., Osaka, Japan

[21] Appl. No.: 601,097

[22] Filed: Feb. 14, 1996

[51] Int. Cl.⁶ .................................................. G05G 11/00
[52] U.S. Cl. .............................. 74/489; 74/502.2; 74/475
[58] Field of Search .................................. 74/489, 502.2, 74/475, 551.8, 551.9

[56] References Cited

U.S. PATENT DOCUMENTS

| | | | |
|---|---|---|---|
| 1,319,627 | 10/1919 | Sentinella | 74/489 |
| 3,915,028 | 10/1975 | Kine | 74/489 |
| 5,012,692 | 5/1991 | Nagano | 74/489 |
| 5,203,213 | 4/1993 | Nagano | 74/489 |
| 5,287,766 | 2/1994 | Nagano | 74/502.2 |
| 5,299,466 | 4/1994 | Heilbron | 74/502.2 |
| 5,392,669 | 2/1995 | Li | 74/502.2 |
| 5,626,058 | 5/1997 | Karpowich et al. | 74/502.2 X |
| 5,678,455 | 10/1997 | Watarai | 74/489 |

FOREIGN PATENT DOCUMENTS 719 702 A2  7/1996  European Pat. Off. ....... B62M 25/04

OTHER PUBLICATIONS

European search report for EP 97300465.8, dated May 23, 1997.

*Primary Examiner*—Charles A. Marmor
*Assistant Examiner*—David M. Fenstermacher
*Attorney, Agent, or Firm*—James A. Deland

[57] ABSTRACT

A bicycle shift control device for attachment to a handlebar including a first grip extending laterally with respect to the bicycle and a second grip extending forwardly with respect to the bicycle. The device includes first and second shift levers extending from the shift control device so that the first and second shift levers are disposed in close proximity to the first grip and to the second grip when the shifting device is mounted to the bicycle. Each shift lever includes a first finger tab positioned so that the first finger tab is disposed in close proximity to the first grip when the shift control device is mounted to the bicycle, and a second finger tab positioned so that the second finger tab is disposed in close proximity to the second grip when the shift control device is mounted to the bicycle. The first shift lever may extend generally parallel to the second shift lever and/or the first shift lever may be disposed in close proximity to the second shift lever for a majority of the length of the first shift lever. The shift operating device may be constructed so that the shift levers also function as brake levers.

25 Claims, 8 Drawing Sheets

EXTENSION HANDLE FOR A BICYCLE SHIFTING DEVICE

BACKGROUND OF THE INVENTION

The present invention is directed to bicycle control devices and, more specifically, to a device which controls the shifting of a bicycle transmission.

Bicycle shift control devices are often mounted to handlebars so that the shift control device may be operated by the cyclist's thumb or index finger while the cyclist is grasping the handlebar. In the case of bicycles equipped with laterally extending handlebars, extension members are often attached to the ends of the handlebar so that the extension members extend forwardly from the handlebar. The extension members provide additional positions to grasp the handlebar to accommodate variations in traveling speed or posture. Unfortunately, if the shift control device is mounted to the main handlebar and the cyclist is grasping the extension member, then the cyclist must change the hand position in order to operate the shift control device. The same is true if the shift control device is mounted on the extension member and the cyclist is grasping the main handlebar.

SUMMARY OF THE INVENTION

The present invention is directed to a bicycle shift control device which allows the cyclist to operate the shift control device regardless of the position of the cyclist's hand on the handlebar and without requiring the cyclist to remove the hand from the handlebar. One embodiment of the present invention is directed to a bicycle shift control device for attachment to a handlebar including a first grip extending laterally with respect to the bicycle and a second grip extending forwardly with respect to the bicycle. In this embodiment the device comprises a first shift lever extending from the shift control device so that the first shift lever is disposed in close proximity to the first grip and to the second grip when the shifting device is mounted to the bicycle. The first shift lever includes a first finger tab positioned so that the first finger tab is disposed in close proximity to the first grip when the shift control device is mounted to the bicycle, and a second finger tab positioned so that the second finger tab is disposed in close proximity to the second grip when the shift control device is mounted to the bicycle.

In a more specific embodiment, the first shift lever includes a first arm portion for extending along the first grip when the shift control device is mounted to the bicycle, and a second arm portion for extending along the second grip when the shift control device is mounted to the bicycle. In this embodiment the first finger tab is disposed on the first arm portion, and the second finger tab is disposed on the second arm portion. In an alternative embodiment, the first shift lever includes a first arm portion for extending in close proximity to the first grip when the shift control device is mounted to the bicycle, a second arm portion for extending along the second grip when the shift control device is mounted to the bicycle, and a third arm portion for extending along the first grip. The first finger tab is disposed on the first arm portion, and the second finger tab is disposed on the second arm portion. The third arm portion extends generally perpendicularly to the first arm portion and to the second arm portion, and the first arm portion extends generally parallel to the second arm portion.

In a more specific embodiment, a second shift lever extends from the shift control device so that the second shift lever is disposed in close proximity to the first grip and to the second grip when the shifting device is mounted to the bicycle. The second shift lever includes a first finger tab positioned so that the first finger tab is disposed in close proximity to the first grip when the shift control device is mounted to the bicycle, and a second finger tab positioned so that the second finger tab is disposed in close proximity to the second grip when the shift control device is mounted to the bicycle. In this embodiment the first shift lever may extend generally parallel to the second shift lever and/or the first shift lever may be disposed in close proximity to the second shift lever for a majority of the length of the first shift lever.

If desired, the shift operating device may be constructed so that the shift levers also function as brake levers, again without requiring the cyclist to remove the hand from the handlebar. In this embodiment the first and/or second shift levers may be connected to the shift control device for pivoting about a first axis, and the shift control device is adapted to be coupled to the bicycle for pivoting about a second axis that is different from the first axis. The shift control device includes a brake cable attachment location for attachment to a brake cable so that the brake may be operated by pulling the shift levers.

DETAILED DESCRIPTION OF THE EMBODIMENTS

Figure 1:
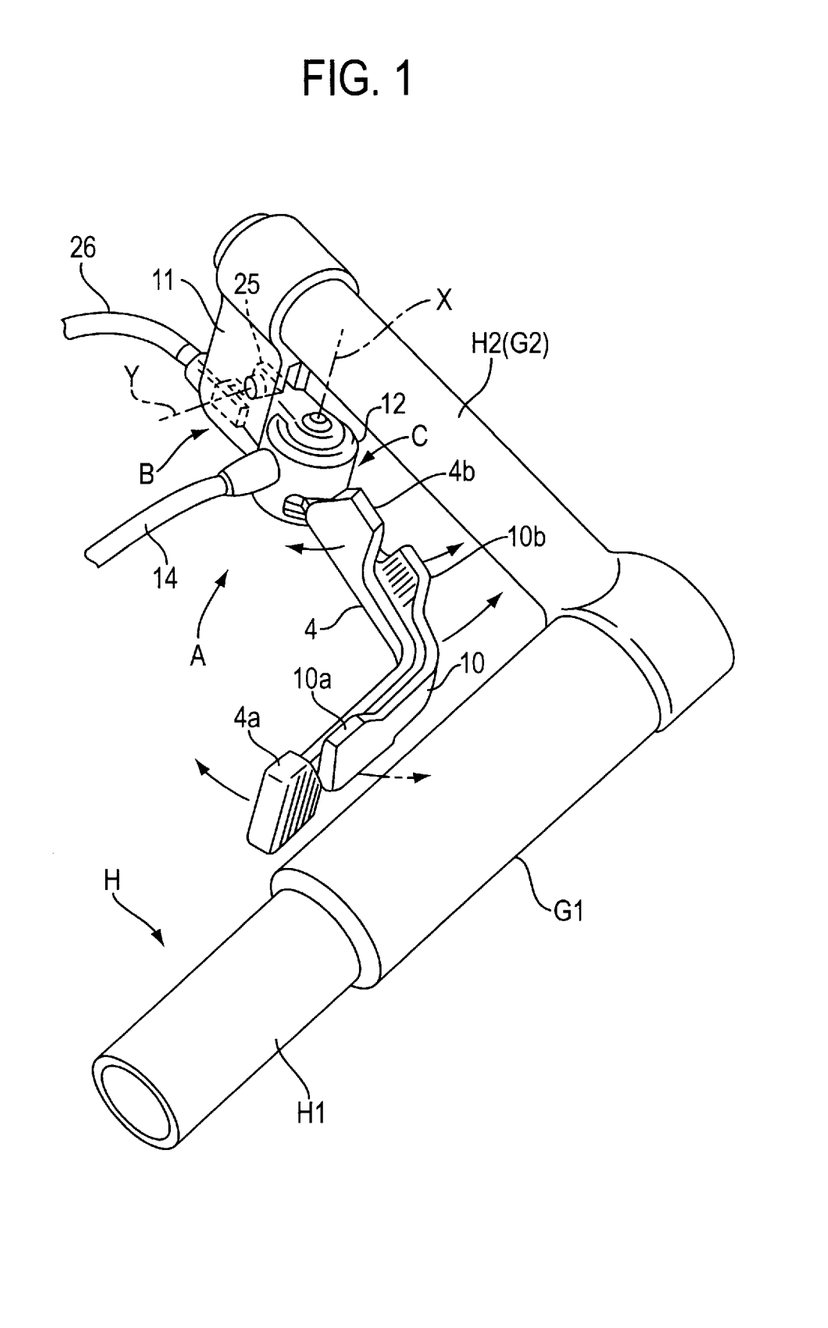
FIG. 1 is a perspective view of a particular embodiment of a shift control device according to the present invention attached to a bicycle.

As shown in FIG. 1, a control device A is attached to a bicycle handlebar H and is used to control various shifters (not shown) and brakes (not shown) internally mounted in rear-wheel hubs or externally mounted for rear use, front use, or the like. The handlebar H comprises a main handlebar H1 for turtling the bicycle frame to the left and right, and sub-handlebars H2 projecting forward beyond the bicycle frame at the left and right ends of the main handlebar H1. The control device A is attached with the aid of a support bracket 11 to the tip of a sub-handlebar H2. The control device A combines a shift controller C and a brake controller B. The shift controller C will be described first.

Figure 2:
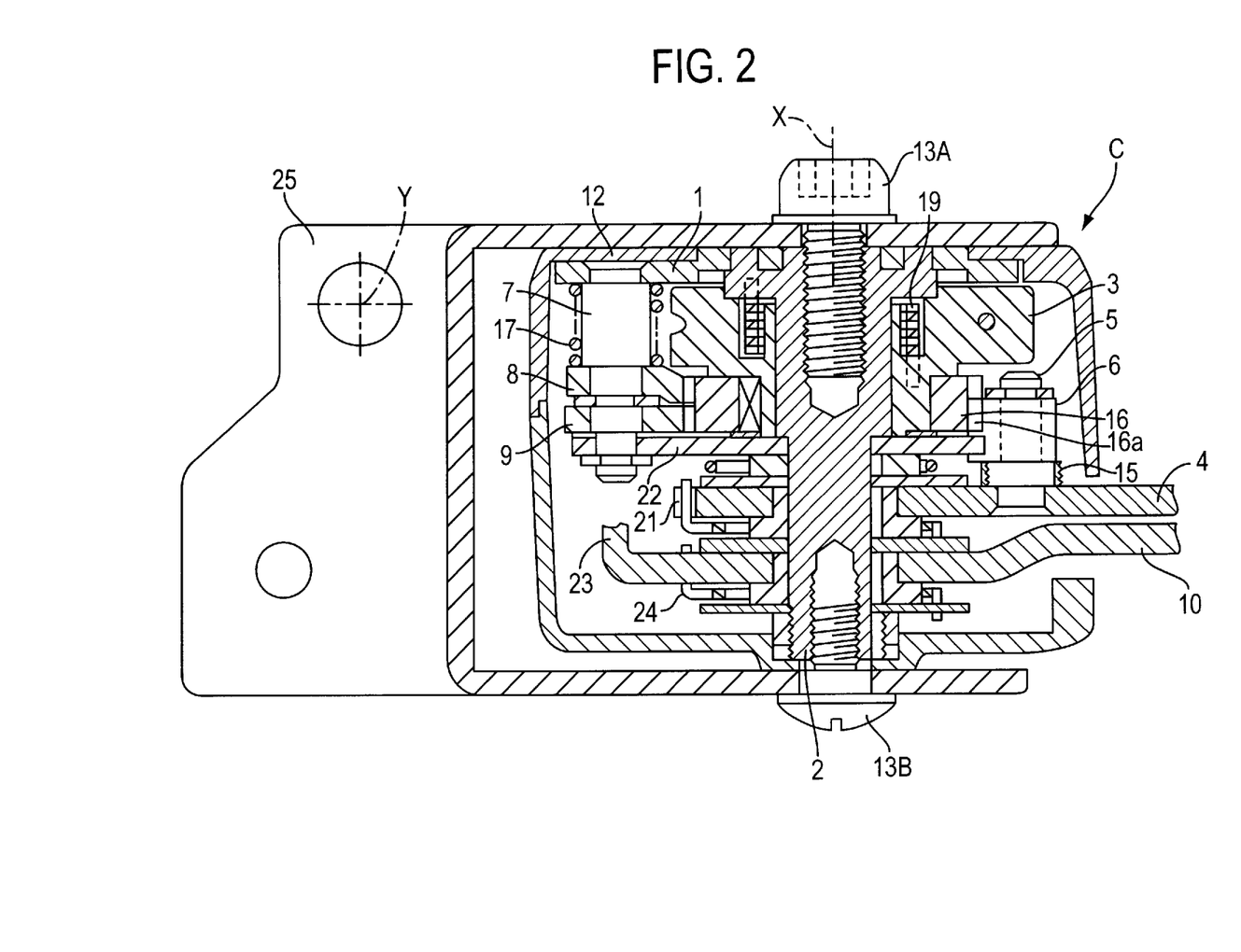
FIG. 2 is a cross sectional view of a particular embodiment of a shift controller according to the present invention.

As shown in FIG. 2, a winder 3 is rotatably attached to a support member 1 in the form of a flat plate with the aid of a spindle 2 incapable of rotating with respect to the support member 1. A winding lever 4 serving as a first shift lever for rotatably operating the winder 3 in the winding direction and letting it automatically return to the original position is rotatably attached to the spindle 2 with the aid of a one-way mechanism described below. The winding lever 4 and the winder 3 are configured in such a way that they both can rotate about the axis X of the spindle 2.

A pawl-pivoted spindle 5 is fixed to the winding lever 4, and a feed pawl 6 for the winder 3 is swingably attached to the pawl-pivoted spindle 5. A first positioning pawl 8 and a second positioning pawl 9 are swingably attached to the support member 1 with the aid of a fixed pawl-pivoted spindle 7. A rewinding lever 10 functioning as a second shift lever rotatably operates the winder 3 in the payoff direction by the swingable operation of these first positioning pawl 8 and second positioning pawl 9. The rewinding lever 10 fits on the spindle 2 in such a way that rotation about the axis X of the spindle 2 is possible, and is configured in such a way that an automatic return to the initial position N2 is possible.

A cover 12 covers the support member 1, the winder 3, the positioning pawls 8 and 9, the base end sides of the levers 4 and 10, and the like. These components constitute a shift controller C for a bicycle. The two positioning pawls 8 and 9 and a positioning member 16 will be referred to as "a positioning mechanism 18."

Figure 3:
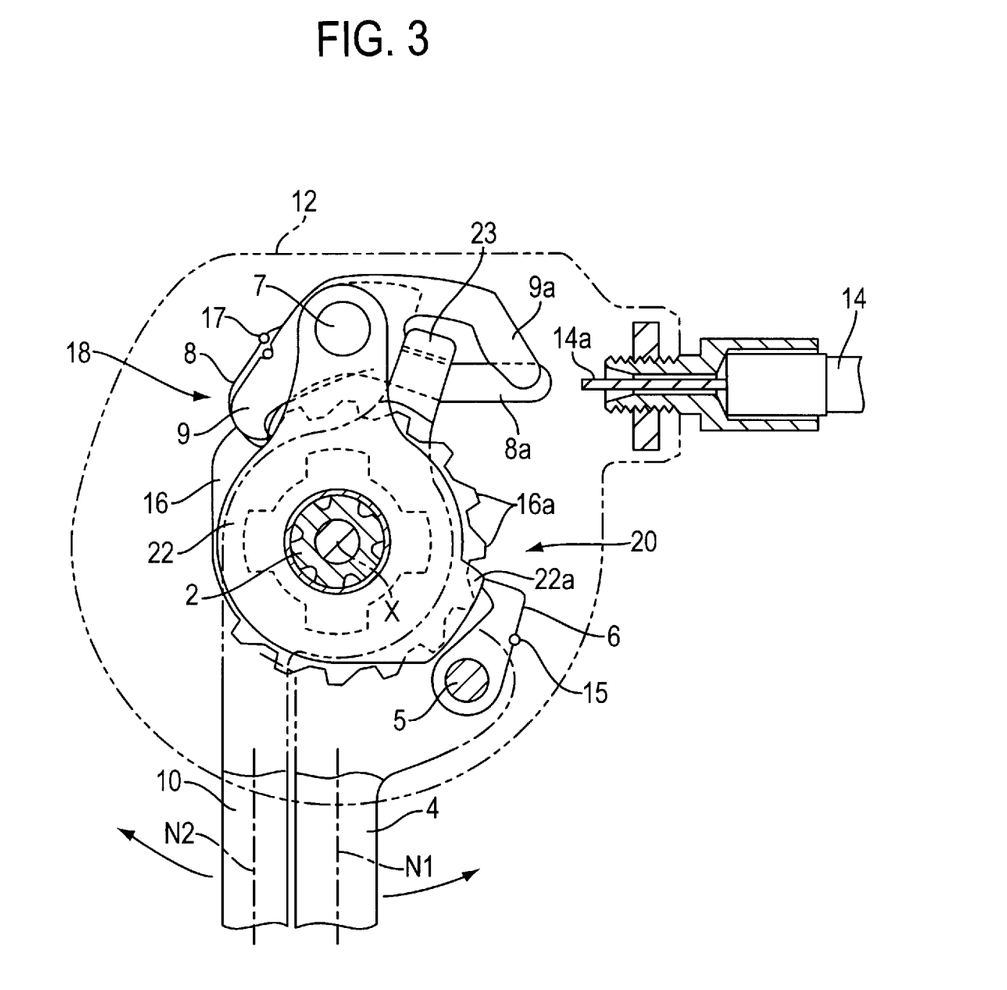
FIG. 3 is a bottom view showing the ratchet and pawl mechanism used in the shift controller.

As shown in FIGS. 1 and 3, shift controller C is configured in such a way that the inner cable 14a of a shift cable 14 from a variety of shifters (not shown) is connected to the winder 3, and the winding of the winder 3 by the winding lever 4, as well as the payoff of the winder 3 by the rewinding lever 10, tighten or slacken the shift cable 14 and switch the shifter. A detailed structure will now be described.

In this embodiment, the winding lever 4 extends in the form of a cantilever at an approximate right angle along the inside of the handlebar H beyond the base end portions that are set on the spindle 2. The winding lever 4 comprises a second finger tab 4b that faces a second grip G2 provided to the sub-handlebar H2, and a first finger tab 4a that faces a first grip G1 provided to the main handlebar H1. To shift gears, the first finger tab 4a is pushed with the index finger and moved forward with respect to the frame while the hand grasps the first grip G1, or the second finger tab 4b is pushed with the thumb and moved in the direction of the arrow while the hand grasps the second grip G2. As a result, the inner cable 14a of the shift cable 14 is wound by the winder 3.

Figure 4:
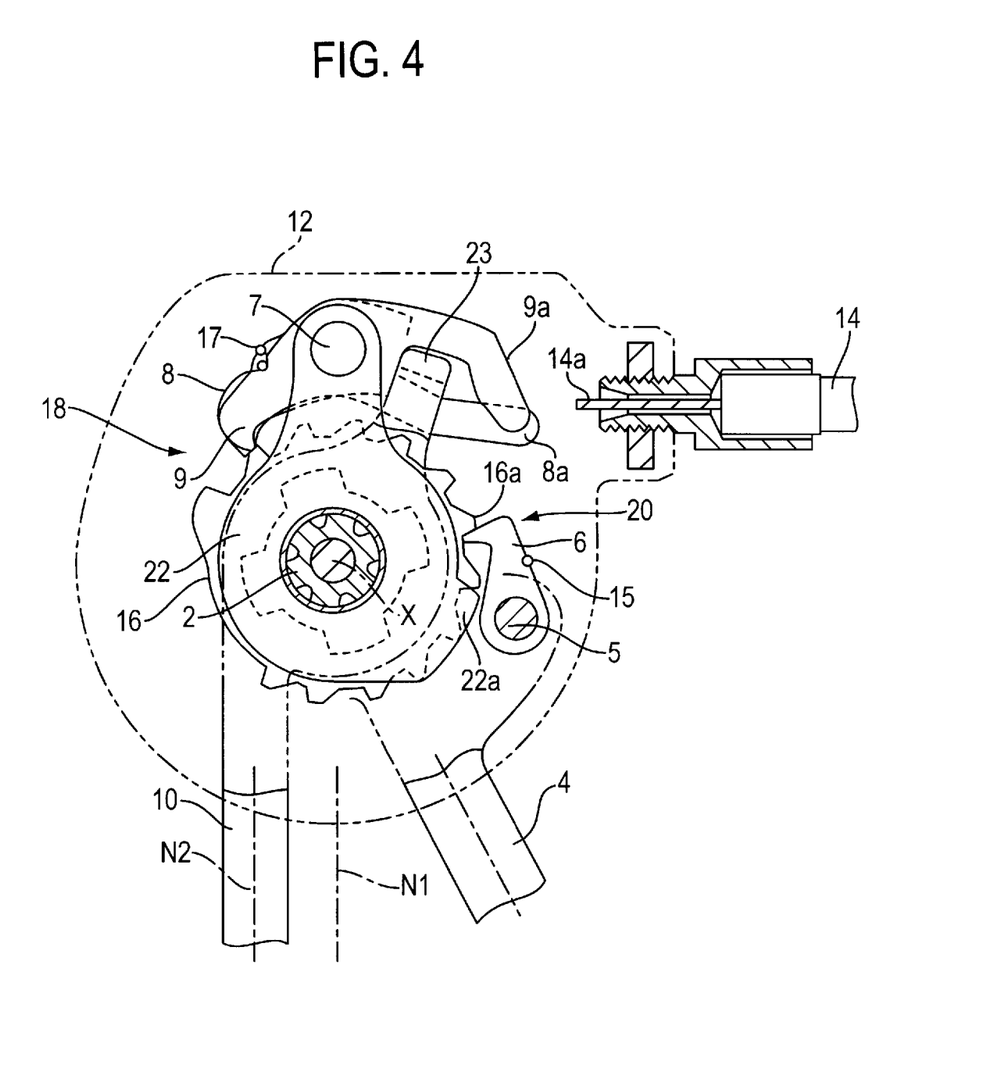
FIG. 4 is a bottom view illustrating the operation of the ratchet and pawl mechanism shown in FIG. 3 when the winding lever is moved away from its initial position.
Figure 5:
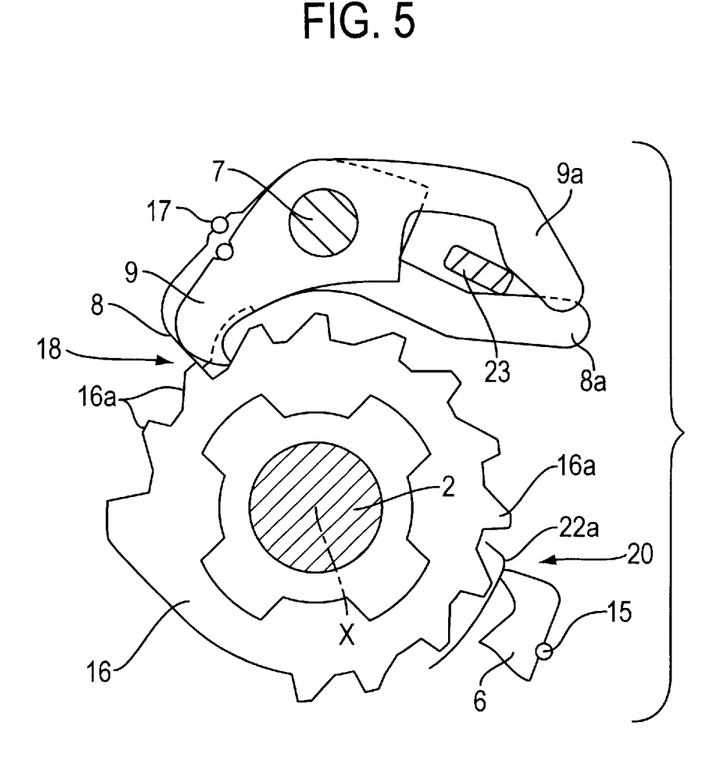
FIG. 5 is a detailed view of the ratchet and pawl mechanism shown in FIG. 3 illustrating the engagement of the positioning pawls with the ratchet mechanism after the winding lever is returned to its initial position.

As shown in FIG. 4, when the winding lever 4 is moved from the initial position N1 away from the first grip G1, the feed pawl 6 supported on the guide member 22 described below is energized by a feed pawl spring 15, with the result that, as shown in FIG. 5, the boss portion of the winder 3 engages one of the ratchet teeth 16a of the positioning member 16 assembled in such a way that it can turn as a whole, the winder 3 is rotated in the winding direction through the intermediary of this positioning member 16, and the inner cable 14a is wound up. In the process, the first positioning pawl 8 and second positioning pawl 9 are disengaged from the ratchet tooth 16a by the outward pushing action caused by the tooth shape of the ratchet teeth 16a, making it possible to rotate the winder 3 with the aid of the winding lever 4.

When the winding lever 4 is swung to a predetermined angle, the cable winding stroke of the winder 3 reaches a prescribed stroke, the shifter is switched from the pre-shifting state to the target speed state on the high speed side, and the first positioning pawl 8 is caused to engage one of the ratchet teeth 16a by the energizing action of a pawl spring 17, positioning and holding the winder 3 in the target position. Thus, even when the operating force exerted on the winding lever 4 is released, the positioning mechanism 18, which is composed of the first positioning pawl 8, the positioning member 16, and the like, positions the winder 3 in the target position and keeps it in this position irrespective of the energizing force of an unwinding spring 19 exerted on the winder 3, or the cable pulling force based on the self-restoring force of the shifter.

The winding lever 4 is coupled to the winder 3 via a one-way mechanism 20 composed of the feed pawl 6, the positioning member 16, and the like, so the initial position N1 is automatically restored by the energizing action of a return spring 21 when the operating force on the winding lever 4 is released. The rewinding of the winder 3 described above is possible when this initial position N1 has been restored, because the toe of the feed pawl 6 is lifted above the guide portion 22a of the guide member 22 that is set on the spindle 2 without the possibility of rotation, and the coupling with the winder 3 is canceled.

The rewinding lever 10 extends in the form of a cantilever at an approximate right angle along the handlebar H beyond the base end portions that are set on the spindle 2, and remains close and roughly perpendicular to the winding lever 4 between the winding lever 4 and the handlebar H. The winding lever 10 comprises a second finger tab 10b that faces the second grip G2 provided to the sub-handlebar H2, and a first finger tab 10a that faces the first grip G1 provided to the main handlebar H1. To shift gears, the first finger tab 10a is pulled with the index finger and moved backward with respect to the frame while the hand grasps the first grip G1, or the second finger tab 10b is pulled with the thumb and moved closer to the second grip G2 while the hand grasps the second grip G2.

The inner cable 14a of the shift cable 14 is repeatedly rewound by the movement of the rewinding lever 10 from the initial position N2 (idling position) toward the handlebar H. More specifically, when the rewinding lever 10 is pulled from the initial position N2 toward the handlebar H, a plate-shaped release member 23 integrally projecting upward beyond the tip of the rewinding lever 10 enters the gap between the arm portion 8a of the first positioning pawl 8 and the arm portion 9a of the second positioning pawl 9, as shown in FIG. 5, exerting pressure on the arm portion 9a of the second positioning pawl 9 and forcing the toe of the second positioning pawl 9 between the ratchet teeth 16a. At this time, the toe of the first positioning pawl 8 comes into contact with one of the ratchet teeth 16a, the positioning of the winder 3 is retained, and the winder 3 does not rotate.

Figure 6:
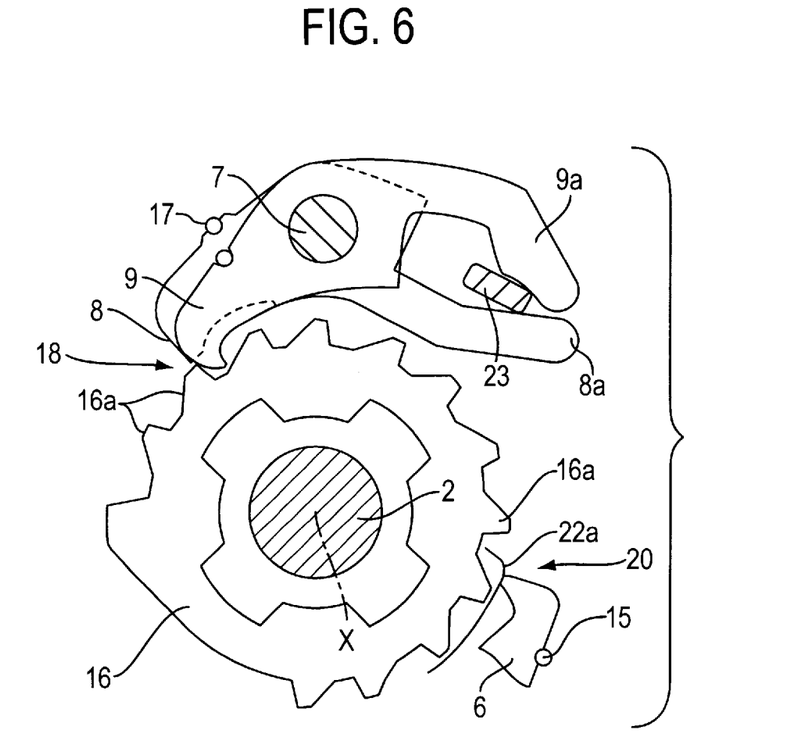
FIG. 6 is a detailed view of the ratchet and pawl mechanism shown in FIG. 3 illustrating the operation of the positioning pawls when the rewinding lever is moved away from its initial position.
Figure 7:
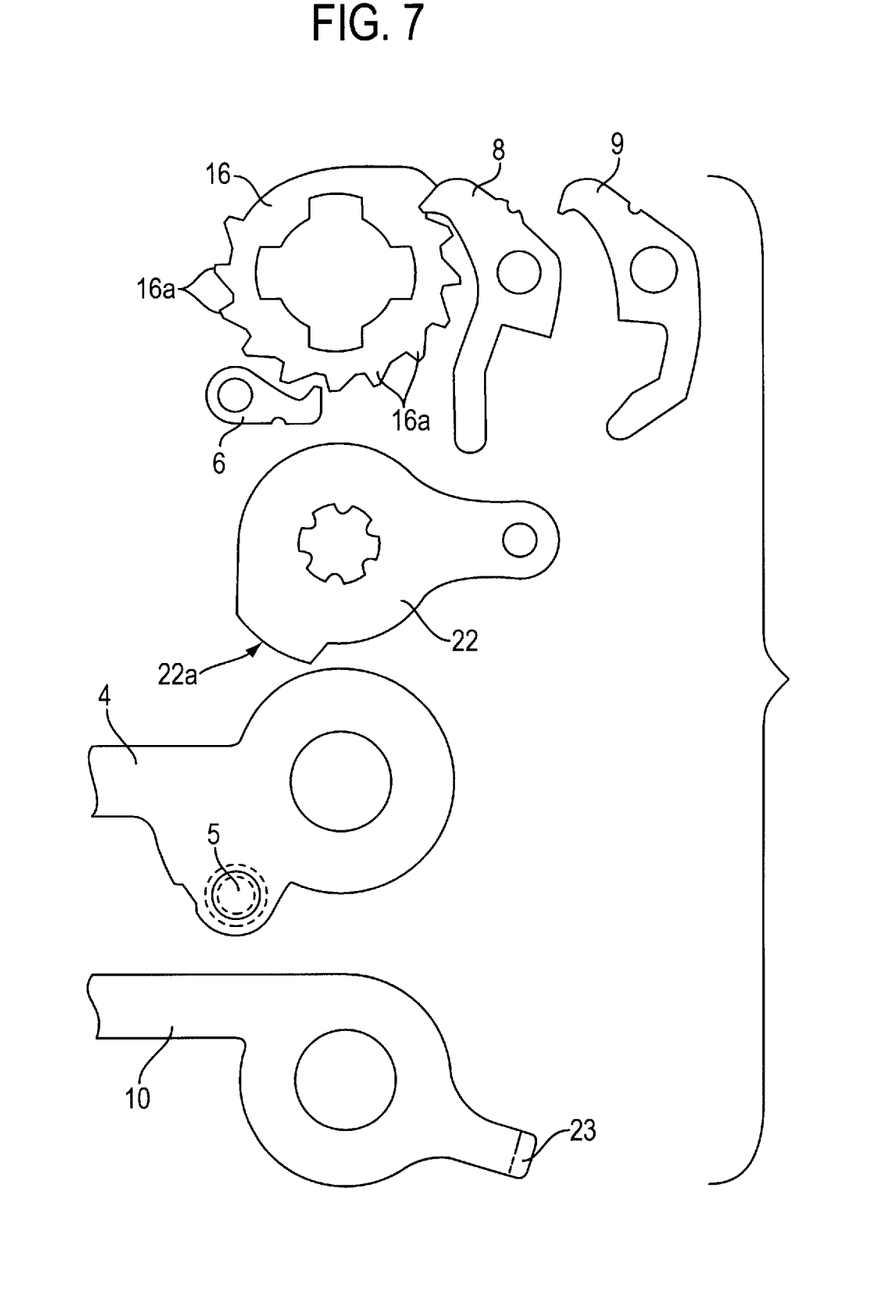
FIG. 7 is an exploded view of major portions of the shift controller shown in FIG. 2.

If the rewinding lever 10 is further pulled from this state until a prescribed position is reached, the release member 23 will exert pressure on the arm portion 8a of the first positioning pawl 8, as shown in FIG. 6, and the toe of the first positioning pawl 8 will be disengaged from the previously contacted ratchet tooth 16a. When this happens, the winder 3 rotates a certain amount in the rewinding direction because of the energizing action of the unwinding spring 19 and the cable-pulling action of the shifter. At this time, the ratchet tooth 16a previously disengaged from the first positioning pawl 8 comes into contact with the toe of the second positioning pawl 9, preventing the winder 3 from uncontrollably rotating in the rewinding direction.

When the operating force exerted on the rewinding lever 10 is released, the rewinding lever 10 is automatically returned to the initial position N1 by the energizing action of the a return spring 24, and the release member 23 releases the pressing exerted on the arm portion 9a of the second positioning pawl 9. When this happens, the second positioning pawl 9 is disengaged from the ratchet tooth 16a by the outward pushing of the ratchet tooth 16a of the rotating winder 3 due to the toe shape of this second positioning pawl 9, the winder 3 rotates in the rewinding direction, the cable rewinding stroke of the winder 3 reaches a prescribed stroke, and the shifter is switched from the pre-shifting state to the next lower speed state. The toe of the first positioning pawl 8 is subsequently forced by the energizing action of the pawl spring 17 into the gap between the ratchet tooth 16a previously disengaged from the first positioning pawl 8 and the ratchet tooth 16a that follows this ratchet tooth 16a, and brought into contact with this subsequent ratchet tooth 16a, maintaining the winder 3 in the new speed state acquired following switching. Thus, operating the rewinding lever 10 makes it possible to cancel the state in which the winder 3 is held in place by the positioning mechanism 18, and to shift the gears to the next lower speed.

As shown in FIGS. 1 and 2, the shift controller C is fixedly attached to a swing frame 25 with the aid of two (upper and lower) bolts 13A and 13B screwed into the spindle 2 on the top and bottom surfaces of a cover 12 that houses the shift controller C. The swing frame 25 is attached to a support bracket 11, itself attached to the sub-handlebar H2, with the aid of pivot pins to allow swinging about the pin axis Y. The pin axis Y is oriented orthogonal to the axis X of the spindle 2. The end of a brake cable 26 that is joined to a brake device (not shown) is connected to the internal end portion of the swing frame 25, and the brake device is actuated when the swing frame 25 is rotated. If desired, the brake cable 26 may be positioned inside the handlebar H. A coiled return spring on a pin axle acts on the swing frame 25, providing an arrangement in which a return to the original operating position is possible. A braking operation performed by grasping the winding lever 4 and rewinding lever 10 together with the first grip G1 or the second grip G2, and by lifting the two levers 4 and 10 in order to bring them closer to the first grip G1.

Figure 8:
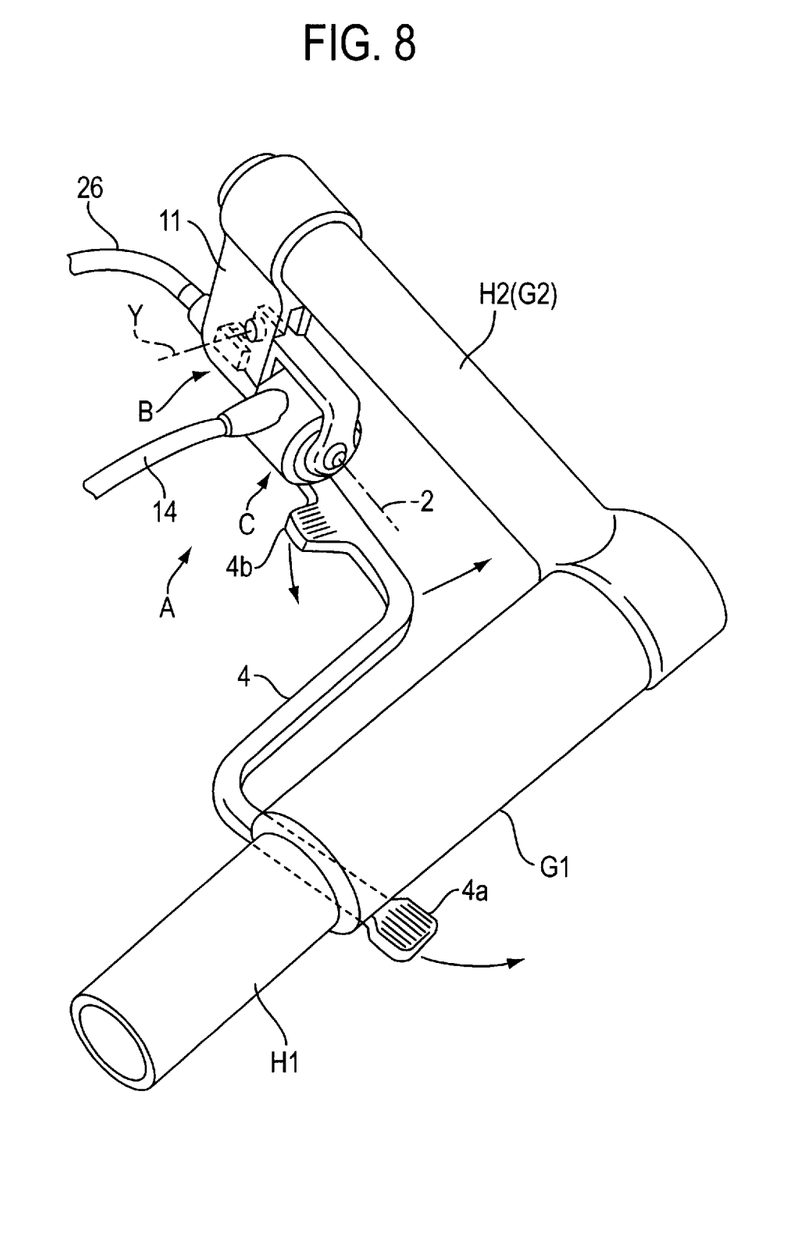
FIG. 8 is a perspective view of an alternative embodiment of a shift control device according to the present invention attached to a bicycle.

FIG. 8 is a perspective view of an alternative embodiment of a bicycle shift control device according to the present invention. In this embodiment, shifting is accomplished by a mere push with the thumb. As shown in FIG. 8, a component that extends toward the rear of the frame is formed on the tip of a first shift lever 4, which extends along the handlebar H beyond the shift controller C swingably supported on a support bracket 11 installed at the tip of the sub-handlebar H2. The rewinding lever 10 is still provided, but it has been omitted from the drawings. A first finger tab 4a is formed in the back end portion of this component, and a second finger tab 4b is formed near the support bracket 11. The first shift lever 4 is supported in such a way that it can swing about an axis Z parallel to the axis of the sub-handlebar H2. Such a structure allows the first shift lever 4 to rotate about the axis Z, rotating the winder 3 when the first finger tab 4a is pushed in with the thumb while the first grip G1 of the main handlebar H1 is grasped. When the second grip G2 of the sub-handlebar H2 is grasped, the first shift lever 4 can be rotated about the axis Z by pressing the second finger tab 4b inward with the thumb in the same manner. This structure is the same as that described above in that braking can be accomplished by pulling the shift lever closer while grasping the grip G1 or G2.

While the above is a description of various embodiments of the present invention, further modifications may be employed without departing from the spirit and scope of the present invention. For example, although a structure in which both the winding lever 4 and the rewinding lever 10 are swing levers was described above as a specific structural example the levers 4 and 10, is also possible for the two levers 4 and 10 to be slide levers, or for one of them to be a swing lever and the other a slide lever. Many other structures are also possible. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labelling.

What is claimed is:

1. A bicycle shift control device for attachment to a handlebar including a first grip (G1) extending laterally with respect to the bicycle and a second grip (G2) extending forwardly with respect to the bicycle, the device comprising:
   a first shift lever (4) extending from the shift control device so that the first shift lever (4) is disposed in close proximity to the first grip (G1) and to the second grip (G2) when the shifting device is mounted to the bicycle, the first shift lever (4) including:
      a first finger tab (4a) positioned so that the first finger tab (4a) is disposed in close proximity to the first grip (G1) when the shift control device is mounted to the bicycle; and
      a second finger tab (4b) positioned so that the second finger tab (4a) is disposed in close proximity to the second grip (G2) when the shift control device is mounted to the bicycle.

2. The device according to claim 1 wherein the first shift lever (4) includes:
   a first arm portion for extending along the first grip (G1) when the shift control device is mounted to the bicycle, the first finger tab (4a) being disposed on the first arm portion; and
   a second arm portion for extending along the second grip (G2) when the shift control device is mounted to the bicycle, the second finger tab (4b) being disposed on the second arm portion.

3. The device according to claim 2 wherein the first arm portion extends generally perpendicularly to the second arm portion.

4. The device according to claim 1 wherein the first shift lever (4) includes:
   a first arm portion for extending in close proximity to the first grip (G1) when the shift control device is mounted to the bicycle, the first finger tab (4a) being disposed on the first arm portion;
   a second arm portion for extending along the second grip (G2) when the shift control device is mounted to the bicycle, the second finger tab (4b) being disposed on the second arm portion;
   a third arm portion for extending along the first grip (G1);
   wherein the third arm portion extends generally perpendicularly to the first arm portion and to the second arm portion; and
   wherein the first arm portion extends generally parallel to the second arm portion.

5. The device according to claim 1 wherein the first shift lever (4) is connected to the shift control device for pivoting about a first axis (X,Z).

6. The device according to claim 5 wherein the shift control device is adapted to be coupled to the bicycle for pivoting about a second axis (Y), and wherein the shift control device includes a brake cable attachment location for attachment to a brake cable (26).

7. The device according to claim 6 wherein the second axis (Y) is different from the first axis (X,Z).

8. The device according to claim 7 wherein the first axis (X,Z) is oriented generally perpendicularly to the second axis (Y).

9. The device according to claim 5 wherein the first axis (X) is oriented generally perpendicularly to the second grip (G2).

10. The device according to claim 9 wherein the shift control device is adapted to be coupled to the bicycle for pivoting about a second axis (Y), and wherein the shift control device includes a brake cable attachment location for attachment to a brake cable (26).

11. The device according to claim 10 wherein the second axis (Y) is different from the first axis (X).

12. The device according to claim 11 wherein the first axis (X) is oriented generally perpendicularly to the second axis (Y).

13. The device according to claim 12 wherein the second axis (Y) is oriented generally parallel to the first grip (G1).

14. The device according to claim 5 wherein the first axis (Z) is oriented generally parallel to the second grip (G2).

15. The device according to claim 14 wherein the shift control device is adapted to be coupled to the bicycle for pivoting about a second axis (Y), and wherein the shift control device includes a brake cable attachment location for attachment to a brake cable (26).

16. The device according to claim 15 wherein the second axis (Y) is different from the first axis (Z).

17. The device according to claim 16 wherein the first axis (Z) is oriented generally perpendicularly to the second axis (Y).

18. The device according to claim 17 wherein the second axis (Y) is oriented generally parallel to the first grip (G1).

19. The device according to claim 1 further comprising:
a second shift lever (10) extending from the shift control device so that the second shift lever (10) is disposed in close proximity to the first grip (G1) and to the second grip (G2) when the shifting device is mounted to the bicycle, the second shift lever (10) including:
a first finger tab (10a) positioned so that the first finger tab (10a) is disposed in close proximity to the first grip (G1) when the shift control device is mounted to the bicycle; and
a second finger tab (10a) positioned so that the second finger tab (10 b) is disposed in close proximity to the second grip (G2) when the shift control device is mounted to the bicycle.

20. The device according to claim 19 wherein the first shift lever (4) extends generally parallel to the second shift lever (10).

21. The device according to claim 20 wherein the first shift lever (4) is disposed in close proximity to the second shift lever (10) for a majority of the length of the first shift lever (4).

22. The device according to claim 19 wherein one of the first shift lever (4) or the second shift lever (10) is connected to the shift operating device for causing the shift operating device to shift a bicycle transmission in an upshift direction, and wherein the other one of the first shift lever (4) or the second shift lever (10) is connected to the shift operating device for causing the shift operating device to shift the bicycle transmission in a downshift direction.

23. The device according to claim 19 wherein the first shift lever (4) is connected to the shift operating device for moving from a first home position (N1) to a first shift position, wherein the second shift lever (10) is connected to the shift operating device for moving from a second home position (N2) to a second shift position, and further comprising:
first return means for automatically returning the first shift lever (4) to the first home position (N1) when the first shift lever (4) is released from the first shift position; and
second return means for automatically returning the second shift lever (10) to the second home position (N2) when the second shift lever (10) is released from the second shift position.

24. The device according to claim 23 wherein the shift operating device includes a cable winding member (3) for alternately winding and unwinding a transmission cable (14a), wherein the first shift lever (4) is coupled to the winding member (3) for causing the winding member (3) to wind the transmission cable (14a) in response to movement of the first shift lever (4) from the first home position (N1)to the first shift position, and wherein the second shift lever (10) is coupled to the winding member (3) for causing the winding member (3) to unwind the transmission cable (14a) in response to movement of the second shift lever (10) from the second home position (N2) to the second shift position.

25. A bicycle shift control device for attachment to a handlebar including a first grip (G1) extending laterally with respect to the bicycle and a second grip (G2) extending forwardly with respect to the bicycle, the device comprising:
a first shift lever (4) extending from the shift control device so that the first shift lever (4) is disposed in close proximity to the first grip (G1) and to the second grip (G2) when the shifting device is mounted to the bicycle, the first shift lever (4) including:
a first protrusion forming a first finger tab (4a) positioned so that the first finger tab (4a) is disposed in close proximity to the first grip (G1) when the shift control device is mounted to the bicycle; and
a second protrusion forming a second finger tab (4b) positioned so that the second finger tab (4a) is disposed in close proximity to the second grip (G2) when the shift control device is mounted to the bicycle.

* * * * *